(No Model.)

J. M. CARROLL.
HORIZONTAL EXCAVATOR.

No. 574,661.

Patented Jan. 5, 1897.

5 Sheets—Sheet 1.

Witnesses
C. F. Kilgore
R. D. Merchant

Inventor
John M. Carroll
By his Attorney
Jas. F. Williamson (No Model.)  5 Sheets—Sheet 2.

J. M. CARROLL.
HORIZONTAL EXCAVATOR.

No. 574,661.  Patented Jan. 5, 1897.

Witnesses
C. F. Kilgore
Q. D. Merchant

Inventor
John M. Carroll
By his Attorney
Jas. F. Williamson (No Model.) 5 Sheets—Sheet 3.

J. M. CARROLL.
HORIZONTAL EXCAVATOR.

No. 574,661. Patented Jan. 5, 1897.

Witnesses.
C. F. Kilgore
F. D. Merchant

Inventor.
John M. Carroll.
By his Attorney.
Jas. F. Williamson.

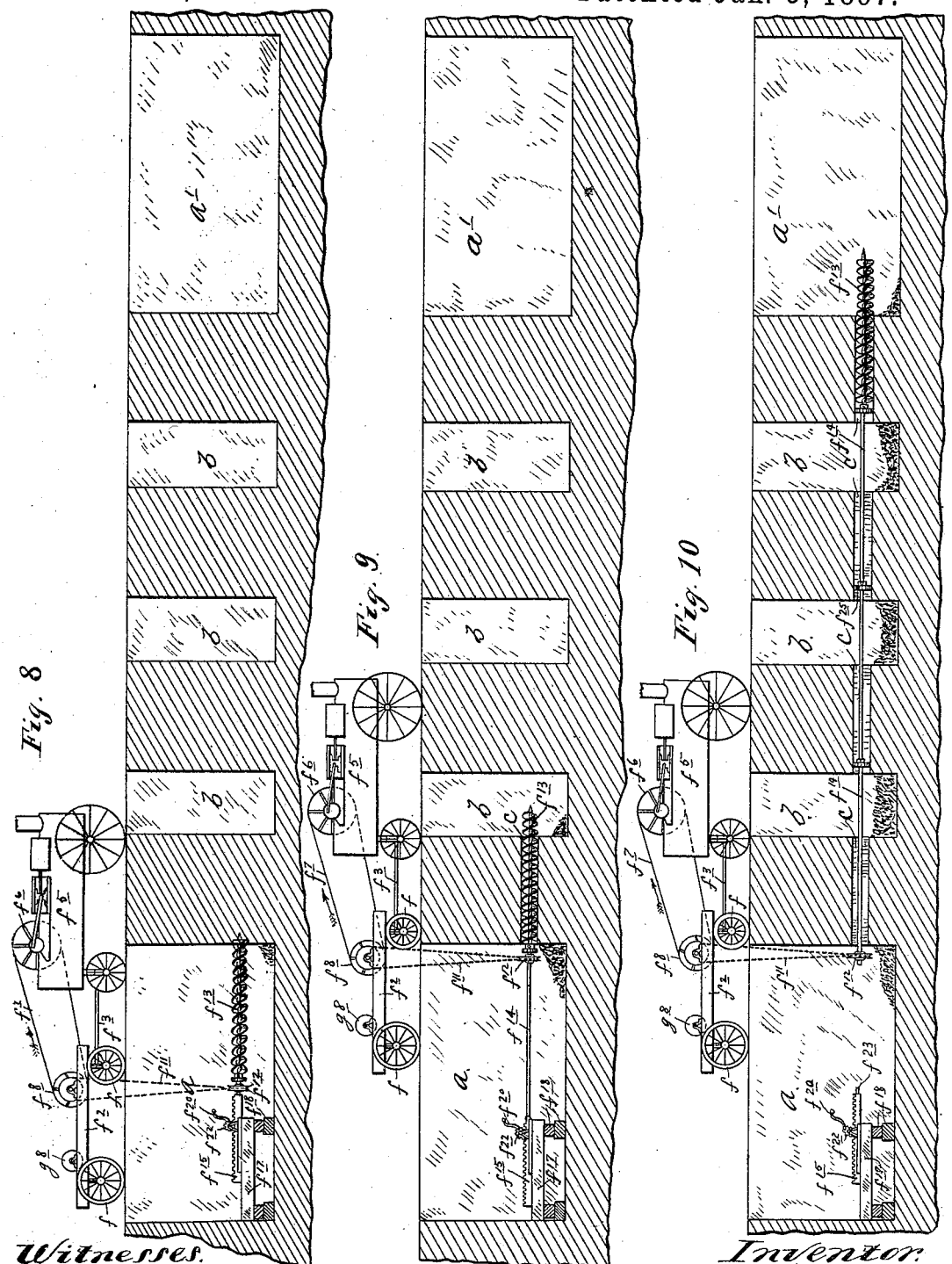

(No Model.)  
5 Sheets—Sheet 5.
J. M. CARROLL.
HORIZONTAL EXCAVATOR.
No. 574,661. Patented Jan. 5, 1897.
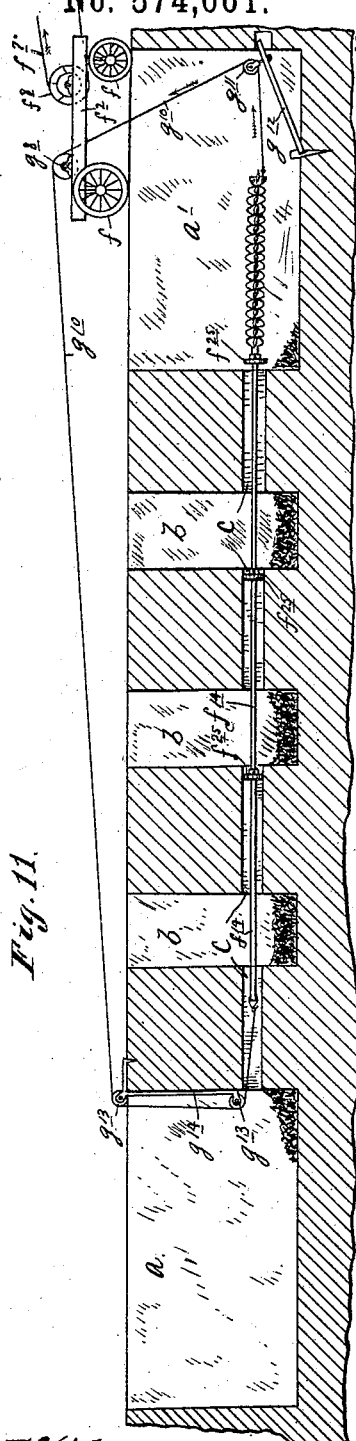
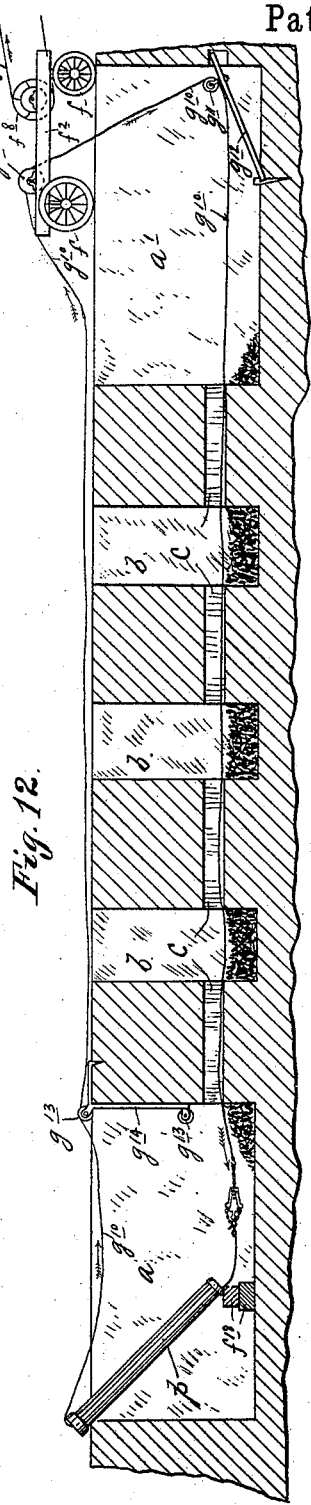
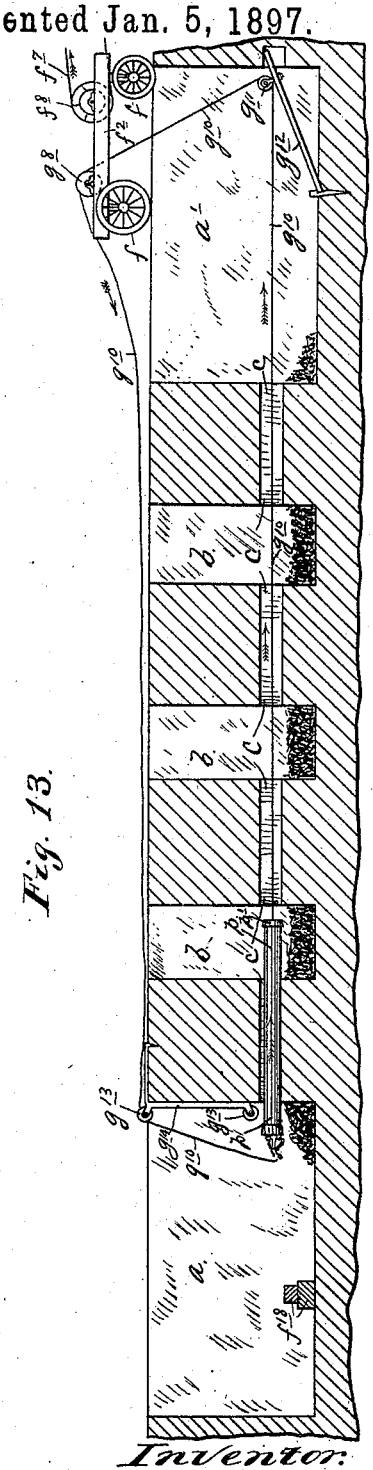
Witnesses.
Inventor:
John M. Carroll.
By his Attorney,
Jas. F. Williamson.

UNITED STATES PATENT OFFICE.

JOHN M. CARROLL, OF GRAND FORKS, NORTH DAKOTA.

HORIZONTAL EXCAVATOR.

SPECIFICATION forming part of Letters Patent No. 574,661, dated January 5, 1897.

Application filed April 21, 1896. Serial No. 588,440. (No model.)

*To all whom it may concern:*

Be it known that I, JOHN M. CARROLL, a citizen of the United States, residing at Grand Forks, in the county of Grand Forks and State of North Dakota, have invented certain new and useful Improvements in Horizontal Excavators; and I do hereby declare the following to be a full, clear, and exact description of the invention, such as will enable others skilled in the art to which it appertains to make and use the same.

My invention has for its object to provide an improved apparatus for laying pipes below the surface of the ground. Briefly summarized, my invention involves a truck adapted to span the pit and movable over the surface of the ground, and an auger adapted to be operated within a pit by means of a chain-drive or equivalent device, which in turn is driven from a power device or motor carried by the portable truck.

In my present invention I also employ a novel pipe-clamp for drawing the pipe-sections through the horizontal bore made between the pits.

The said apparatus is illustrated in the accompanying drawings, wherein, like notations referring to like parts throughout the several views—

Figure 1:
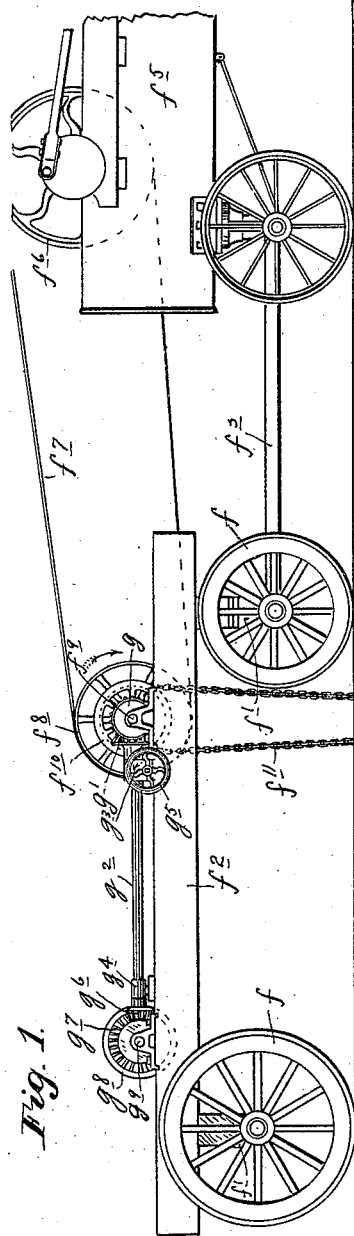
Figure 1:
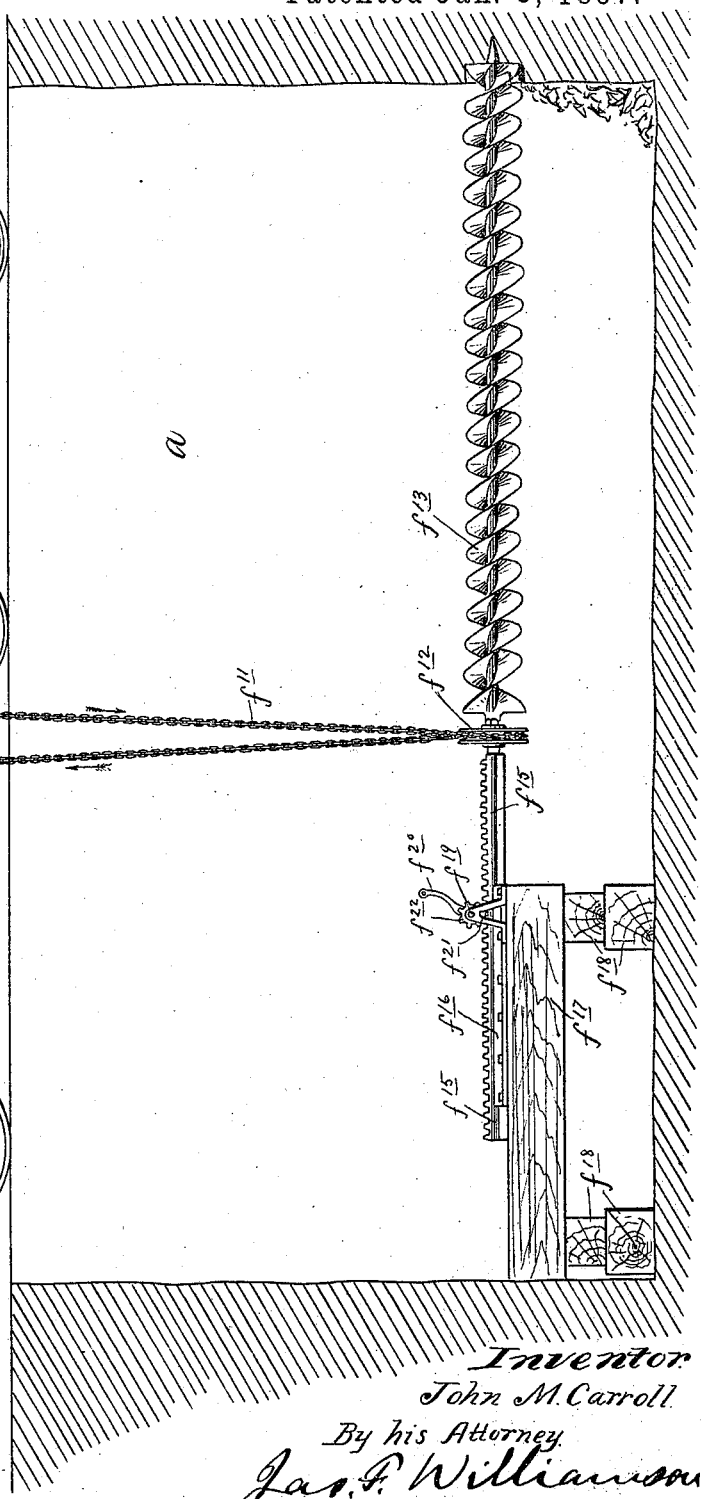
Figure 2:
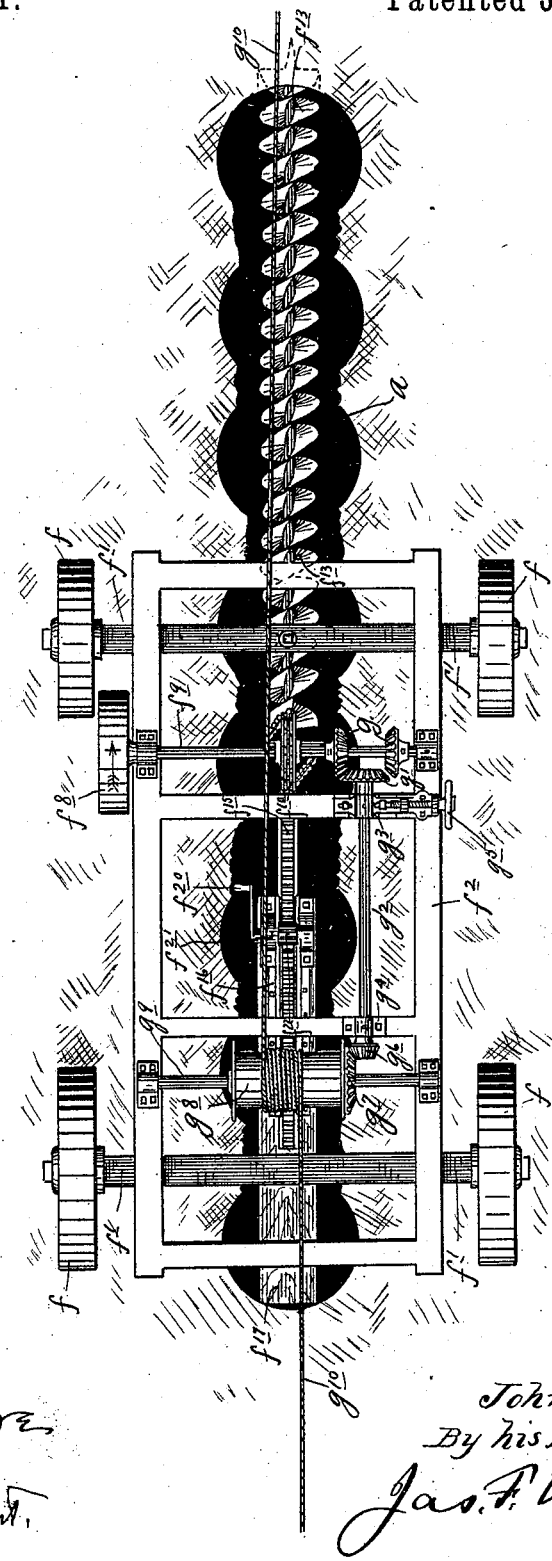
Figure 3:
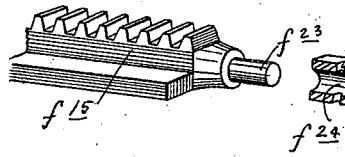
Figure 4:
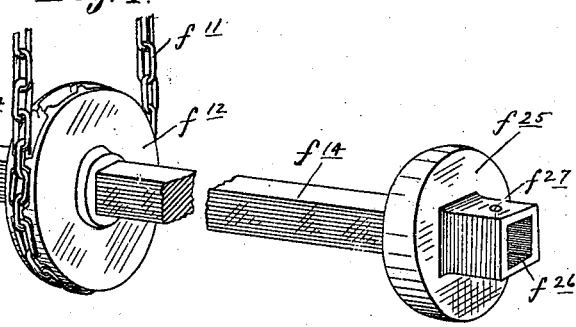
Figure 5:
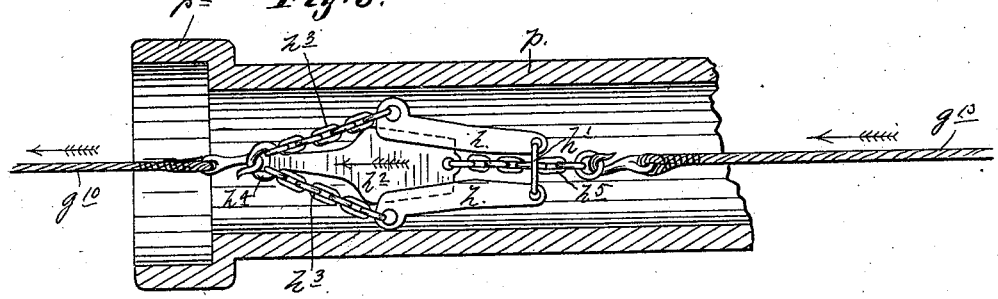
Figure 6:
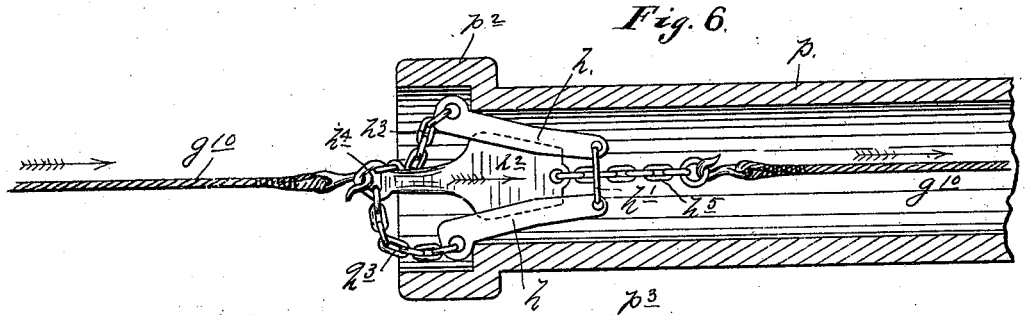
Figure 7:
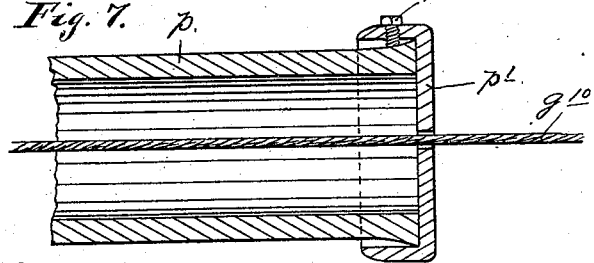

Figure 1 is a view of the apparatus as it would appear when starting to bore the underground trench, the apparatus being shown in elevation with some parts broken away and the pit being shown in vertical section. Fig. 2 is a plan view of the parts shown in Fig. 1 in the same position as in Fig. 1, but with the engine removed. Fig. 3 is a perspective view of a part of the feed-rack for effecting the feed of the horizontal auger at its start into the first bench of the bore. Fig. 4 is a perspective view of one of the boring-bar sections, with some parts broken away, which are used after the auger passes through the first bench to continue the boring action through the subsequent benches. Fig. 5 is a detail showing part of one of the pipe-sections in vertical longitudinal section and showing the pipe-clamp and part of the cable within the pipe as the clamp would appear when collapsed and moving rearward through the pipe. Fig. 6 is a similar view showing the same parts as in Fig. 5, but with the pipe-clamp as it would appear when in clamping position for drawing in the pipe-section under the forward movement of the cable. Fig. 7 is a detail in section, showing part of one of the pipe-sections, with the temporary cap applied to the forward end of the same, which are used to prevent the filling of the pipe when drawing the same into the trench. Figs. 8 to 13, inclusive, are diagram views for illustrating the use of the apparatus in boring the underground trench and laying the pipe.

$a$ $a'$ represent vertical pits of sufficient length or size for entering and starting the horizontal auger and for entering the pipe-sections, and $b$ represents a series of intervening pits of smaller size than the pits $a'$, but of sufficient size to serve as manholes. The said pits $a$, $a'$, and $b$ are spaced apart from each other at proper points to intersect the underground trench $c$, which is intended to be made at the intended points for the pipe-joints. All of the said pits are sunk to a depth below the intended underground trench $c$. The said pits above described may be speedily sunk by the vertical excavator disclosed in my above-identified companion case.

$f$ $f'$ $f^2$ represent, respectively, the wheels, the axles, and the body of a suitable truck, which is adapted to straddle the pits above noted. The said truck is connected by a pole or coupling-rod $f^3$ to a traction or other form of portable engine $f^5$. The pulley $f^6$ and the engine-shaft are connected by belt $f^7$ with a pulley $f^8$ on a cross-shaft $f^9$, mounted in suitable bearings on the forward part of the truck-body $f^2$. The said shaft $f^9$ is provided with a chain-wheel $f^{10}$, which is connected by chain $f^{11}$ with a chain-wheel $f^{12}$, adapted to be applied either to the stem-head of the auger $f^{13}$ or to the boring-bars $f^{14}$, which are adapted to be coupled to the auger $f^{13}$.

$f^{15}$ is a feed-rack mounted to move between guides $f^{16}$, fixed to a suitable bed-block $f^{17}$, adapted to be supported in one of the pits $a$ $a'$, &c., in any suitable way, as by the blocks $f^{18}$. A shaft $f^{19}$, with crank-handle $f^{20}$, is mounted in suitable bearings $f^{21}$, fixed to the bed-block $f^{17}$, and carries a pinion $f^{22}$, which engages with the feed-rack $f^{15}$. The feed-rack $f^{15}$ is provided with a pintle end $f^{23}$, which is adapted to enter a corresponding seat or socket $f^{24}$ in the rear end of each of the boring-bars $f^{14}$ and in the stem-head of the auger itself. The boring-bars $f^{14}$ are provided at their forward ends with guide-disks $f^{25}$ of the same diameter substantially as the diameter of the auger. The said boring-bars $f^{14}$ are also provided at their forward ends with sockets $f^{26}$, which telescope with the rear end of the bars coupled thereto, and when two adjacent bars are thus telescoped they are made fast to each other by suitable pins working through coincident holes $f^{27}$ in the coupled parts of the said bars. The said bars $f^{14}$, the said sockets $f^{26}$, and the passage through the hub of the chain-wheel $f^{12}$ are all of angular form in cross-section, so as to be rotatively connected together. The chain-wheel $f^{12}$ is free to slide on the boring-bar $f^{14}$ or on the stem-head of the auger, as the case may be.

The shaft $f^9$ on the truck is provided with a pair of beveled gears $g$, with either of which may be made to engage a beveled gear $g'$ on the forward end of a longitudinal shaft $g^2$, mounted in suitable bearings $g^3$ $g^4$ on the truck-body. The forward member $g^3$ of said bearings is subject to the action of a hand-screw $g^5$, suitably supported and connected thereto, for shifting the said bearing $g^3$ and the forward end of the shaft $g^2$, as may be required for throwing the beveled gear $g'$ into engagement with one or the other of the beveled gears $g$ or into an intermediate or idle position at will.

The rear end of the shaft $g^2$ is provided with a beveled pinion $g^6$, which engages with a beveled gear $g^7$ on the head of a windlass-drum $g^8$, which is fixed to a cross-shaft $g^9$, mounted in suitable bearings on the truck-body to the rear of the center of the truck. The drum $g^8$ is equipped with a suitable cable $g^{10}$, which is given several wraps about the drum and has its ends extending in opposite directions therefrom and provided with hooks or other suitable coupling devices at its extremities.

With the devices so far described it is obvious that rotary motion may be imparted to the horizontal auger from the engine $f^5$ through the driving connections on the truck and the chain $f^{11}$, depending into the pit, and it is also obvious that by throwing off the chain from either of its wheels $f^{10}$ or $f^{12}$ rotary motion may be imparted in either direction to the windlass-drum $g^8$ at the will of the operator through the beveled gears $g$ $g'$ and the connections therefrom without rotating the augers. The other parts necessary to be noted may be most conveniently described in connection with the description of the operation, which will now be set forth.

Operation: Suppose the vertical pits to have been opened and the apparatus for boring the underground trench to be in the position shown in Figs. 1 and 8, with an operator located in the pit $a$ for imparting the necessary feed movement to the auger. Then, under the rotary motion imparted to the auger from the engine through the drive on the truck and the chain $f^{11}$, depending into the pit, the trench will be opened through the first bench of earth, with the auger guided to a true-line movement by the feed-rack $f^{15}$. As the auger moves forward through the first bench the engine and truck will be moved gradually forward until reaching the position shown in Fig. 9. Then one of the boring-bars $f^{14}$ will be coupled to the auger and the feed-rack, and the boring action will be continued, as before, with the engine and truck remaining stationary in the position shown in Fig. 9. An operator in the pit will slide the chain-wheel $f^{12}$ rearward on the boring-bar $f^{14}$ as the auger and boring-bar move forward under the feed movement imparted thereto by the feed-rack $f^{15}$. As quick as the auger has been fed forward through the first manhole-pit $b$ into the second bench of earth the draft on the auger will of itself serve to effect the feed; and the guide-disk $f^{25}$ at the forward end of the coupling-bar will serve to steady the rear end of the auger in the trench $c$ and guide the same to a true-line movement. Thereafter one after another of the boring-bars $f^{14}$ is coupled in to continue the rotation of the auger without moving the engine or truck. The proportions of the parts and the spacing of the pits are such that the feed-rack $f^{15}$ will be available to effect the feed of the auger when moving through the pits $b$ and to a sufficient distance into the next adjacent bench to render the draft effective for purposes of feed. In this way the augers move forward until fed entirely out into the second large pit $a'$, as shown in Fig. 10. The engine and truck are then moved forward until brought into the position shown in Figs. 11 and 13. The forward end of the cable $g^{10}$ is then coupled to the forward end of the auger, and the rear end of the cable is coupled to the rear end of the last-used boring-bar $f^{14}$. The forward end or strand of the cable $g^{10}$ is guided by a sheave $g^{11}$, fixed to a bar $g^{12}$, which is anchored in the forward corner of the pit $a'$ in any suitable way. The rear end portion of the cable $g^{10}$ is guided by a pair of sheaves $g^{13}$, secured to an angle-iron $g^{14}$, adapted to be hung from the surface into the pit, as shown in Figs. 11 to 13. The windlass is then operated to move the cable in the direction shown by the arrows in Fig. 11. By this forward movement of the cable the auger is drawn into the pit $a'$ and uncoupled. The forward end of the cable is then attached to the next boring-bar $f^{14}$ and again moved forward until the said bar is drawn into the pit $a'$. The said bar is then uncoupled and the operation repeated until all the boring-bars have been drawn through and dropped, together with the auger, in the pit $a'$. This will also bring the rear end of the cable $g^{10}$ into the forward pit $a'$. A pipe-clamp (shown in detail in Figs. 5 and 6) is then coupled to the two ends of the cable. The said clamp is composed of a pair of headed jaws $h$, which are pivotally connected at their rear ends by a link $h'$, a wedge-block spreader $h^2$, working between and guided by flanges of the said jaws $h$, and a pair of chains $h^3$, connecting the forward ends of the jaws $h$ with an eye $h^4$ on the elongated forwardly-extending stem of the wedge-block or spreader $h^2$. The wedge-block $h^2$ is also provided at its rear end with a short chain $h^5$. The forward end of the cable is attached to the chain $h^5$, and the rear end of the cable is attached to the eye $h^4$. When the pipe-clamp has thus been coupled to the cable, the windlass is reversed, so as to move the cable in the direction shown by the arrows in Fig. 12 until the spreader is drawn back into the pit $a$, as shown in said view. A pipe-section $p$ is then partially entered into the pit $a$, as shown in Fig. 12. The rear end of the cable is uncoupled from the clamping-block or pipe-clamp and dropped down through the pipe-section $p$ and the perforated temporary cap $p'$ and again coupled to the pipe-clamp. The rearward motion of the cable is then continued until the pipe-clamp is drawn through the pipe-section $p$, so as to project beyond the rear end of the same. The spreader may thus be pulled through the pipe-section $p$, because when the strain falls on the eye $h^4$ of the wedge-block $h^2$ and the chains $h^3$ the pipe-clamp will be collapsed, as shown in Fig. 5, so as to pass freely through the pipe. After the pipe-clamp is in proper position at the rear end of the pipe-section $p$ the windlass is reversed, so as to move the cable forward. The strain from the cable will then fall onto the wedge-block $h^2$ through the chain $h^5$, which will have the effect of spreading the jaws $h$ at their outer ends, so as to clamp the same against the shoulder between the end of the pipe-section $p$ and the coupling-flange $p^2$ thereof. Hence the pipe-section $p$ will be moved forward with the cable and being properly guided by the operators will be pulled into the trench $c$. The pipe-section $p$ having the temporary cap $p'$ is thus pulled into the trench $c$ until the rear end of the same is at some point inward or directly at the mouth of the first bench. Then the cable is reversed and another pipe-section coupled in with the cable. On reversing the windlass the cable will be again moved forward, and the second section of pipe, having been properly entered at its forward end into the coupling-flange $p^3$ by the operators, will be pulled forward into the trench by the cable and will also push forward the head or leader section of pipe previously entered. In this way one section of pipe after another is drawn into the trench $c$, and the whole series of sections are moved forward until the advance or leader section of pipe $p$ projects into the pit $a'$. The temporary cap $p'$ will then be removed from the leader-section, the pipe-clamp will be uncoupled from the cable ends, the cable will be wound up to its normal position, and the pipe-clamp and the blocks $f^{18}$ moved into the pit $a'$. When the pipe-sections have thus been drawn into proper positions in the trench $c$, the joints will be accessible at the manholes $b$. The workmen will then seal the joints by the application of cement or other sealing material. The pits to the rearward of the pit $a'$ may then be filled. The operations hereinbefore described will then all be repeated for the next section of any underground trench, from the pit $a'$ as the starting-point.

The temporary cap $p'$, which is applied to the leader section of pipe, is removably held thereto in any suitable way, as, for example, by a set-screw $p^3$, and serves to prevent the pipe from filling with dirt when being moved through the trench into its final position.

By the method and apparatus above described it must be obvious that pipe can be laid below the surface of the ground with much less labor and expense than could be done if an open trench were dug for the entire length. The invention was especially designed for use in laying water and sewer pipes in cold countries, where it is necessary to bury the same at considerable distance below the surface on account of frost.

It will be understood, of course, that the minor details of the invention might be changed without departing from the spirit of my invention.

What I claim, and desire to secure by Letters Patent of the United States, is as follows:

1. An excavator for boring an underground trench, comprising a truck adapted to span the pit and movable over the surface of the ground, a horizontal auger adapted to be operated within a pit, a chain-wheel or equivalent device rotatively connected to, but movable lengthwise of, the auger-stem or boring-bar, and a chain driven from a power device carried by said portable support, and passing over said chain-wheel, substantially as described.

2. In an excavator, for boring an underground trench, the combination with a horizontal auger operative from a pit, at the head of the bore, of a series of driving-bars adapted to be coupled to the auger-stem and each other and provided with guide-disks fitting the auger-bore, for guiding the auger to a true-line movement, substantially as described.

3. The combination with the truck, at the surface, of the horizontal auger operative from a pit at the head of the bore, the rack-and-pinion feed in said pit, the driving-bars with guide-disks, adapted to be coupled to the auger-stem and each other, the drive-chain wheel rotatively connected to but movable over said auger-stem and driving-bars, a driven shaft on said truck provided with a chain-wheel and the chain connecting said chain-wheels, substantially as described.

4. The combination with a truck or other portable support, on the surface, and the horizontal auger operative from a pit, at the head of the bore, through to a distant pit, at the foot of the bore, of a windlass on the truck having its cable wrapped about the same with its ends free and extending therefrom, and sheave-blocks adapted to be anchored in the head and foot pits, for rendering the windlass and cable available to drag the auger and other parts, through the bore made by the same, substantially as described.

5. A pipe-clamp for movement through or engagement with the inside of a pipe-section, comprising a pair of expansible and contractible jaws, an expanding device working between said jaws, flexible connections uniting said jaws to said expanding device, with freedom for a limited movement, and a pair of cable-sections attached to said expanding device and extensible through the pipe in opposite directions, substantially as described.

6. The pipe-clamp comprising the jaws $h$ having their inner ends connected by the links $h'$, the wedge-shaped spreader $h^2$ working between said jaws, the chains $h^3$ connecting the outer ends of said jaws with the cable-coupling eye $h^4$, on the outer end of said spreader, and the cable-coupling chain $h^5$, at the inner end of said spreader, substantially as described.

In testimony whereof I affix my signature in presence of two witnesses.

JOHN M. CARROLL.

Witnesses:
PHILIP MCLAUGHLIN,
HUGH P. RYAN.